United States Patent
Qiu et al.

(10) Patent No.: US 9,194,433 B2
(45) Date of Patent: Nov. 24, 2015

(54) CAGE BEARING WITH OIL RETAINING SHIELD

(71) Applicant: Hamilton Sundstrand Corporation, Charlotte, NC (US)

(72) Inventors: Liangheng Qiu, Prairie Grove, IL (US); Leroy Rateike, Rockford, IL (US); David Behling, Belvidere, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 86 days.

(21) Appl. No.: 14/150,283

(22) Filed: Jan. 8, 2014

(65) Prior Publication Data

US 2015/0192175 A1 Jul. 9, 2015

(51) Int. Cl.
*F16C 33/66* (2006.01)
*F16C 33/78* (2006.01)
*H02K 5/173* (2006.01)
*F16C 33/76* (2006.01)
*F16C 19/06* (2006.01)

(52) U.S. Cl.
CPC ........... *F16C 33/6651* (2013.01); *F16C 33/664* (2013.01); *F16C 33/6677* (2013.01); *F16C 33/6681* (2013.01); *F16C 33/7846* (2013.01); *H02K 5/173* (2013.01); *H02K 5/1732* (2013.01); *F16C 19/06* (2013.01); *F16C 33/768* (2013.01); *F16C 33/783* (2013.01); *F16C 2380/26* (2013.01)

(58) Field of Classification Search
CPC .......................... F16C 33/6674; F16C 33/6677
USPC .................. 384/462, 467, 473–475, 478, 484
See application file for complete search history.

(56) References Cited

U.S. PATENT DOCUMENTS 5,749,660 A * 5/1998 Dusserre-Telmon et al. . 384/475

FOREIGN PATENT DOCUMENTS

WO    WO 0142672 A1 *  6/2001

* cited by examiner

*Primary Examiner* — Phillip A Johnson
(74) *Attorney, Agent, or Firm* — Snell & Wilmer, LLP.

(57) ABSTRACT

A bearing system may have an inner race coupled to an outer race defining a lubrication volume and a shield coupled to the outer race, the shield at least partially defining an aperture of the lubrication volume. The aperture may permit the flow of lubricating oil through the bearing system. The shield may retain a quantity of oil within the bearing system. The bearing system may be operated without an oil supply, for example, during an emergency, and the retained quantity of oil may provide ongoing lubrication.

11 Claims, 5 Drawing Sheets

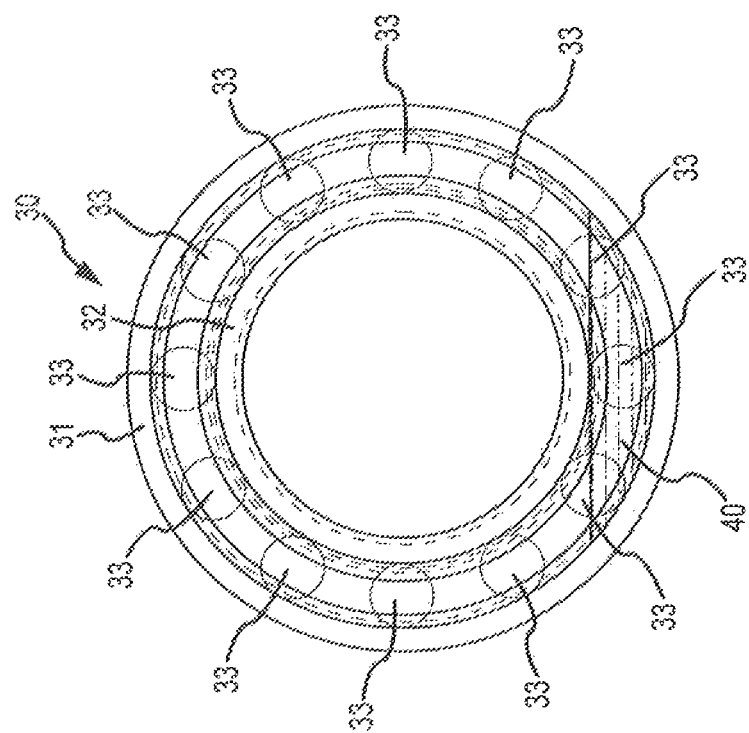
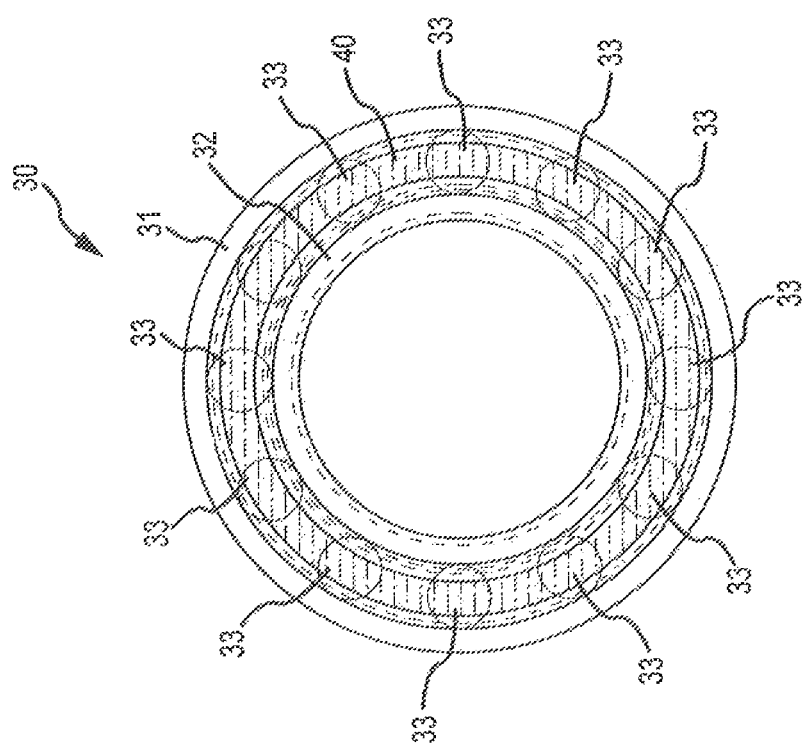

CAGE BEARING WITH OIL RETAINING SHIELD

FIELD

The present disclosure relates to bearing systems, and more specifically, to a bearing system having an oil retaining shield.

BACKGROUND

Typical generator input bearings in aircraft generators (or other generators, other vehicles, etc.) may employ a sintered bronze cage with impregnated oil in order to permit the bearing to remain lubricated for a period of time in the event of an oil system failure. Typically, a sintered bronze cage with impregnated oil inside is placed in and/or around various bearing elements, retaining some oil in proximity to the bearing. However, sintered bronze cam bearings lack the resiliency to operate at high speeds or for long durations, causing the cage and bearing to degrade and/or fail under adverse conditions such as operation at high speed, or for long durations, or in the event of an oil supply interruption.

SUMMARY

In various embodiments, a generator system may comprise a drive shaft, a bearing system, and an input shaft. The drive shaft may be in mechanical communication with the input shaft. The input shaft may be supported by a bearing system. The drive shaft may comprise a drive shaft oil channel, wherein the channel conveys lubricating oil through the center of the drive shaft and into the input shaft. The input shaft may comprise an input shaft oil channel, wherein the channel conveys lubricating oil to the bearing system.

In various embodiments, a bearing system may include an inner race coupled to an outer race defining a lubrication volume and a shield coupled to the outer race, the shield at least partially defining an aperture of the lubrication volume. The inner race may include a bearing oil channel in fluid communication with the lubrication volume. The shield may include a first shield component and a second shield component. Moreover, the shield, the inner race, and the outer race may be annular. The shield may be coupled to the outer race along an outer diameter of the outer race. A friction reducing apparatus, for example, a ball bearing, may be enclosed within the lubrication volume. Finally, a seal may be coupled to the shield. The aperture may permit lubricating oil to escape from the lubrication volume. The shield may retain lubricating oil in the lubrication volume even in the absence of an external oil supply, for example, if the oil supply is disconnected.

In various embodiments, a method of building or operating a bearing system may include coupling an inner race to an outer race to define a lubrication volume, and disposing a shield on the outer race, the shield at least partially defining an aperture of the lubrication volume. The method may also include disposing a friction reducing apparatus within the lubrication volume. Still furthermore, the method may include disposing a seal on the shield. A lubricating oil from a bearing oil channel may be injected into the lubrication space. Furthermore, an aperture may be formed between the shield and the inner race. The inner race may be rotated.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 5A illustrates a rotating bearing system with stored oil retained therein in accordance with various embodiments; and FIG. 5B illustrates a stationary bearing system with stored oil retained therein in accordance with various embodiments.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, phrases such as "make contact with," "coupled to," "touch," "interface with" and "engage" may be used interchangeably.

The term "lubricating oil" may refer to any substance that may act to lubricate two surfaces. For example, lubricating oil may refer to a hydrocarbon based oil, a synthetic oil, and/or any other suitable lubricating material such as polytetrafluoroethylene ("PTFE").

Figure 1:
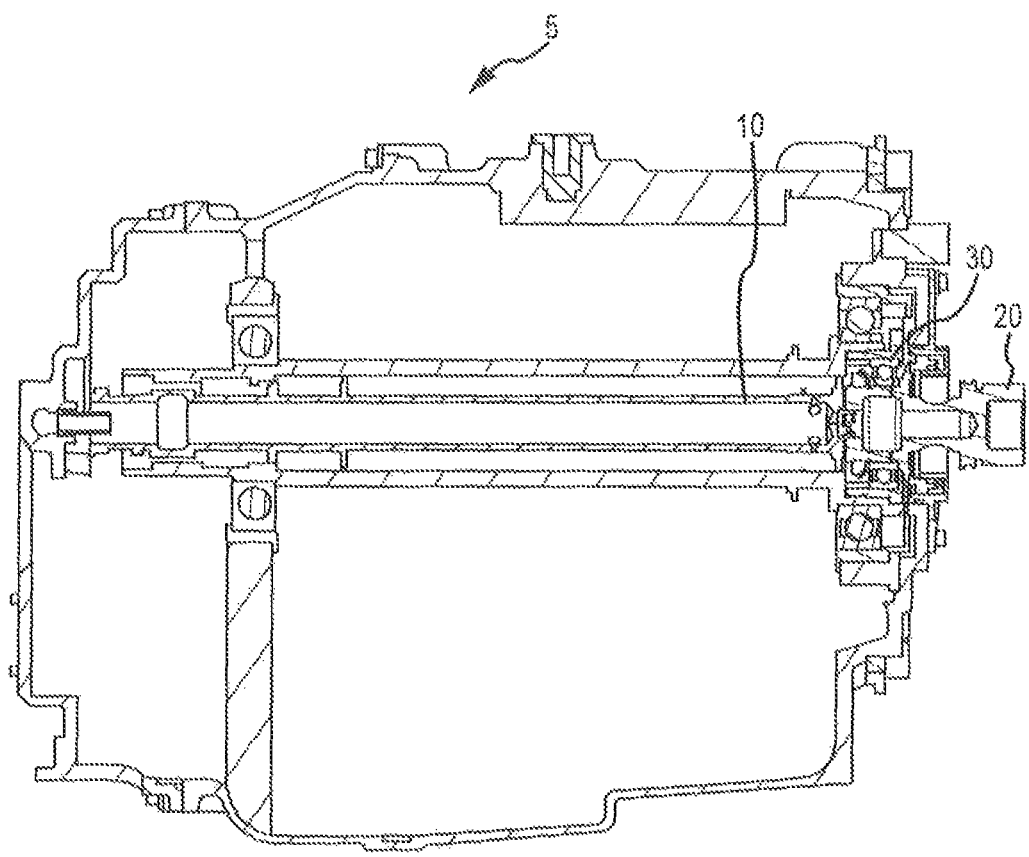
FIG. 1 illustrates a generator system having a bearing system and related hardware in accordance with various embodiments.
Figure 2:
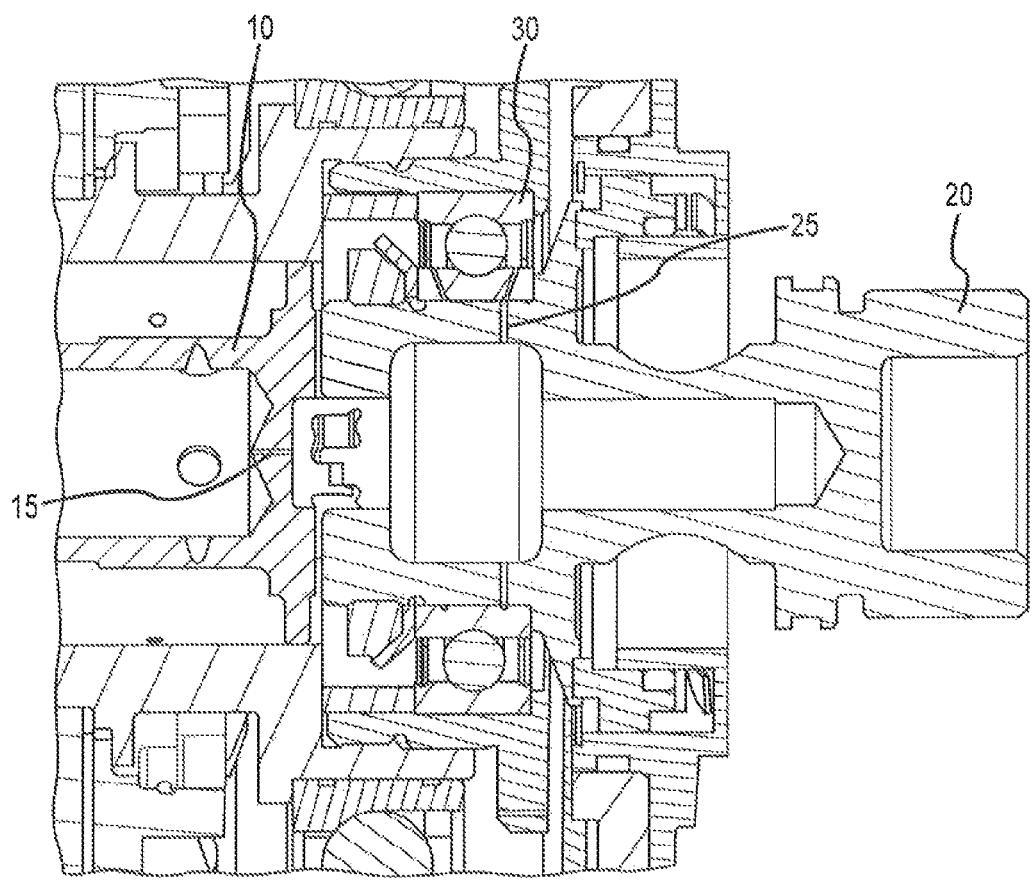
FIG. 2 illustrates a detailed view of a bearing system and related hardware in accordance with various embodiments.

With reference to FIG. 1, in various embodiments, a generator system 5 may comprise a drive shaft 10, a bearing system 30, and an input shaft 20. In operation, the drive shaft 10 may be coupled to the input shaft 20 to drive components of the generator system. A bearing system 30 may support the input shaft 20. With additional reference to FIG. 2, a drive shaft oil channel 15 may convey lubricating oil through the center of the drive shaft 10 and into the input shaft 20, wherein an input shaft oil channel 25 may further convey the lubricating oil to the bearing system.

In various embodiments, a generator system may cease to supply lubricating oil to the bearing system. For example, in the event that drive shaft 10 is disconnected from input shaft 20, for example, to shut down the generator, input shaft 20 may remain spinning, but is unable to receive lubricating oil conveyed through the center of the drive shaft 10. Accordingly, bearing system 30 may remain spinning without access to an external source of lubricating oil. In accordance with the disclosure herein, however, a bearing system 30 may retain sufficient lubricating oil to permit continued lubrication of bearing system 30.

In various embodiments, the bearing systems described herein provide improved reliability as compared to prior bearing systems because various parts are not subject to rapid overheating or rapid failure upon cessation of oil supply. Furthermore, the bearing systems described herein provide improved performance, for example, on system startup, because a volume of oil may be at least partially retained in the hearing system even after system shutdown.

For example, in various embodiments, a bearing system is disclosed. For example, with reference to FIG. 3, a bearing system 30 may comprise an inner race 32 and an outer race 31 which define a lubrication volume 37. In various embodiments, inner race 32 may further comprise a bearing oil channel 35. Inner race 32 may comprise one bearing oil channel 35, or two bearing oil channels 35, or any number of bearing oil channels adapted to convey lubricating oil (or other lubricating fluid) into the lubrication volume 37 between inner race 32 and outer race 31. Moreover, a bearing system 30 may comprise friction reducing apparatus 33 adapted to permit inner race 32 to rotate substantially independently from outer race 31. In various embodiments, friction reducing apparatus 33 may comprise one or more ball bearings. Friction reducing apparatus 33 may also comprise one or more bushings or any other apparatus or combination of apparatuses by which inner race 32 may be permitted to rotate substantially independently from outer race 31.

Figure 3:
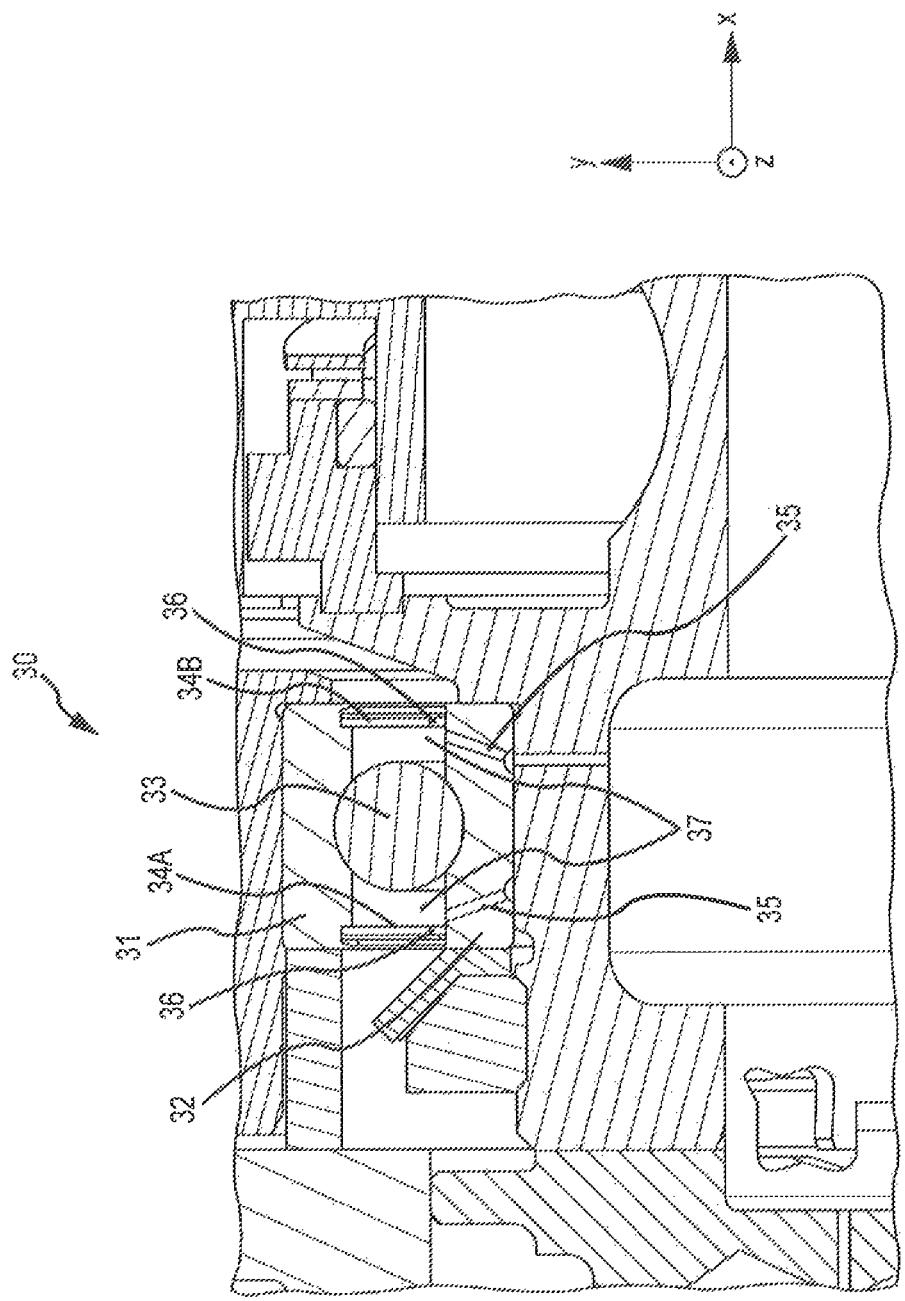
FIG. 3 illustrates various aspects of a bearing system in accordance with various embodiments.

In various embodiments, a bearing system comprises a shield comprising shield component 34a and shield component 34b. Shield component 34a is shown in the negative x direction in FIGS. 3 and 4 from friction reducing apparatus 33, and shield component 34b is shown in the positive x direction in FIG. 4 from friction reducing apparatus 33. With continuing reference to FIG. 3 and additional reference to FIG. 4, in various embodiments a shield component 34a and a shield component 34b extend in the Y-axis between an inner race 32 and an outer race 31. In various embodiments, each shield component is held in place by a retaining ring 41. In various embodiments, a seal 42 extends in the Y-axis between an inner race 32 and an outer race 31 over the surface of each shield component, thereby preventing the oil from leaking from around the shield component. Moreover, a bearing system may comprise one shield component, or multiple shield components, such as shield component 34a and shield component 34b, or any number of shield components, and in various embodiments, a shield component may be one or more pieces, or any number or configuration of pieces adapted to perform the functionality discussed herein.

A bearing system may also comprise an aperture 36. In various embodiments, the shield terminate at aperture 36 so that the aperture 36 permit lubricating oil to escape from the lubrication volume between inner race 32 and outer race 31. In this manner, the oil may escape through aperture 36 to make room for fresh oil to be introduced into the space between inner race 32 and outer race 31 via bearing oil channel 35.

In the event that supply of lubricating oil to the bearing system 30 may cease, the shield retain a quantity of oil within the bearing system 30, for example, while the bearing system 30 is rotating. Moreover, with additional reference to FIG. 5B, the shield retains a quantity of oil within the bearing system 30, for example, while the bearing system 30 is stationary, for example, during ground stops between flights. In this manner, emergency lubrication may be maintained. In the event that supply of lubricating oil to the bearing system 30 may cease, in various embodiments, a bearing system 30 may continue to operate, for example, for between 20 and 80 hours and, in various embodiments, for 50 additional hours of operation as measured from the time the supply of lubricating oil to the bearing system 30 ceases.

Figure 4:
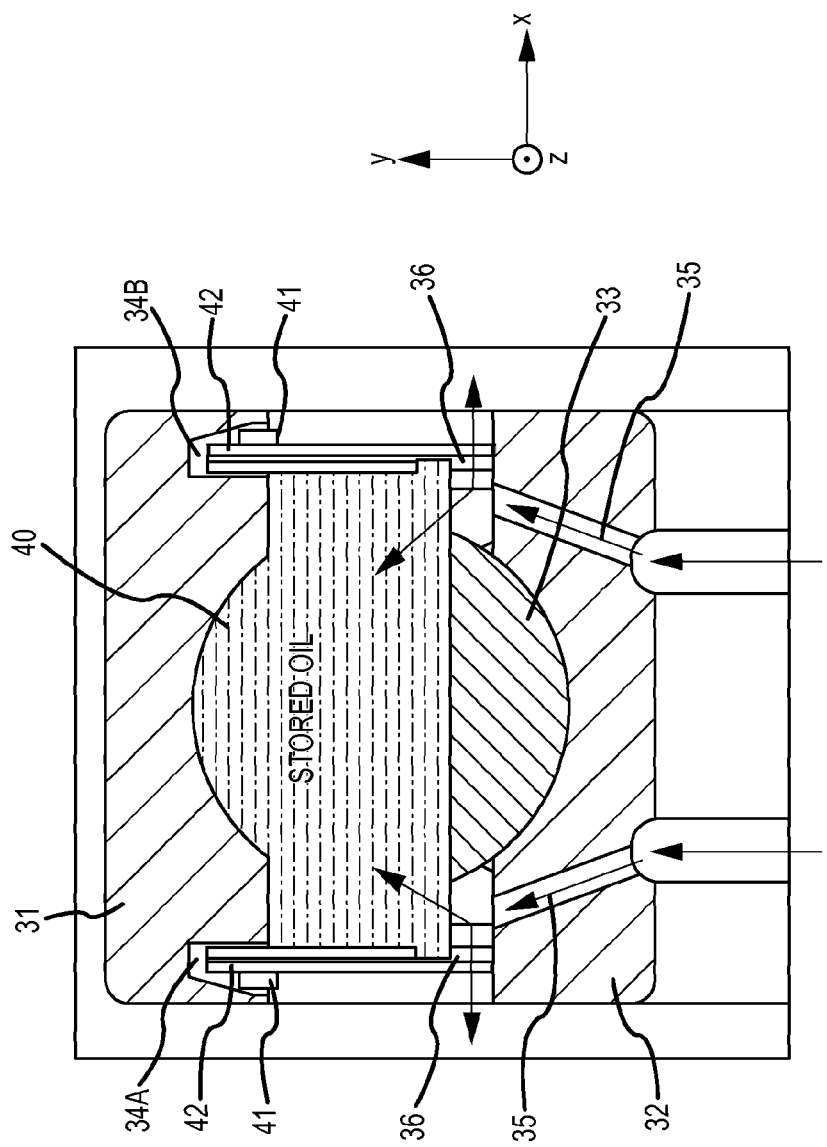
FIG. 4 illustrates a detailed view of various aspects of a bearing system having stored oil retained therein in accordance with various embodiments.

For example, with reference to FIG. 4, stored oil 40 is illustrated. The shield comprising shield component 34a and shield component 34b retains a quantity of stored oil 40 whereas aperture 36 permits the free flow of fresh oil during normal operation, Upon a failure of the oil supply, the shield prevents a quantity of stored oil 40 from escaping the bearing system by limiting the orifice of aperture 36. In this manner, stored oil 40 may be retained in the bearing system 30. For example, the stored oil 40 may be distributed throughout the circumference of bearing system 30, for example, by centrifugal force. As the inner race 32 and/or outer race 31 rotate, the stored oil is carried around the perimeter of bearing system 30 and a quantity is held in fluid communication with the shield. In this manner, stored oil 40 is retained within a lubrication volume of bearing system 30 rather than flowing through aperture 36 and escaping from bearing system 30. Moreover, if the system is shut down and motion of the race(s) ceases, a quantity of stored oil may settle to the bottom of bearing system 30. Shield component 34a and shield component 34b provide barriers whereby a quantity of stored oil is prevented from flowing through aperture 36 and escaping from bearing system 30.

For example, with additional reference to FIG. 5A, during normal operation, lubricating oil may be distributed substantially uniformly throughout bearing system 30. However, with reference to FIG. 5B, during emergency operation, for example, upon the failure of an external oil supply, stored oil 40 may be retained within bearing system 30, even when bearing system 30 is stationary, for example, on shutdown between flights. Upon resumption of operation, stored oil 40 may be distributed throughout the circumference of bearing system 30, for example, by centrifugal force, and yet retained within bearing system 30 by the shield. In various embodiments, the aperture 36 is positioned adjacent to outer race 31 and shield component 34a and shield component 34b are each positioned adjacent to inner race 32 so that the centrifugal force exerted by the spinning bearing system components forces stored oil 40 toward the shield and away from the aperture 36, thereby enhancing the retention of stored oil 40 within the bearing system 30.

Now, having described various components of bearing systems, a bearing system may be manufactured from various materials. In various embodiments, a bearing system may comprise carbon steel. However, in further embodiments, a bearing system may comprise other metals, such as titanium, tungsten, aluminum, or stainless steel, though it may further comprise numerous other materials configured to provide support, such as, for example, rubber, composite, ceramic, fibers, alloy, glass, binder, epoxy, polyester, acrylic, or any material or combination of materials having a desired strength or elasticity sufficient to maintain low friction and resiliency during use. In various embodiments, various portions of bearing systems as disclosed herein are made of different materials or combinations of materials, and/or may comprise coatings.

In various embodiments, bearing systems may comprise multiple materials, or any material configuration suitable to enhance or reinforce the resiliency and/or support of the system when subjected to wear in an aircraft operating environment or to satisfy other desired electromagnetic, chemical, physical, or biological properties.

In various embodiments, the present disclosure provides a bearing system with improved operational life and an ability to operate at high RPMs without failure. Moreover, the bearing system reduces maintenance delays by permitting operation without an oil supply, for example, for 50 hours.

In various embodiments, while the bearing systems described herein have been described in the context of aircraft applications, one will appreciate in light of the present disclosure, that the bearing systems described herein may be used on industrial machinery and various other vehicles such as, for example, trains. Moreover, the bearing systems described herein may be employed with any suitable rotating mass in any installation. In various embodiments, the bearing systems described herein are used in the context of a start generator for use in an aircraft.

Thus, in various embodiments, the bearing systems described herein provide a cost effective and reliable generator bearing system.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims, No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A bearing system comprising:
    an inner race comprising at least one bearing oil channel coupled to an outer race comprising no bearing oil channel, wherein the inner race and outer race define a lubrication volume; and
    a shield comprising a first shield component coupled to the outer race by a retaining ring, and extending from the outer race toward the inner race, wherein the first shield component at least partially defines an aperture of the lubrication volume; and
    a seal extending from the outer race toward the inner race and disposed over a surface of the shield component and over the aperture.

2. The bearing system according to claim 1, wherein the inner race comprises a bearing oil channel in fluid communication with the lubrication volume.

3. The bearing system according to claim 1, wherein the shield further comprises a a second shield component.

4. The bearing system according to claim 1, wherein the shield, the inner race and the outer race are annular.

5. The bearing system according to claim 1, wherein a friction reducing apparatus is enclosed within the lubrication volume.

6. The bearing system according to claim 5, wherein the friction reducing apparatus is a ball bearing.

7. A method comprising:
    coupling an inner race comprising at least one bearing oil channel to an outer race comprising no bearing oil channel, to define a lubrication volume;
    disposing a shield comprising a shield component on the outer race by a retaining ring, and extending from the outer race toward the inner race, the shield at least partially defining an aperture of the lubrication volume; and
    disposing a seal extending from the outer race toward the inner race over a surface of the shield component and over the aperture.

8. The method of claim 7, further comprising disposing a friction reducing apparatus within the lubrication volume.

9. The method of claim 7, further comprising injecting a lubricating oil from a bearing oil channel into the lubrication volume.

10. The method of claim 9, further comprising retaining by the shield stored oil within the lubrication volume.

11. The method of claim 10, wherein a portion of the stored oil is prevented by the shield from flowing through the aperture.

* * * * *

UNITED STATES PATENT AND TRADEMARK OFFICE
CERTIFICATE OF CORRECTION

PATENT NO.       : 9,194,433 B2                              Page 1 of 1
APPLICATION NO.  : 14/150283
DATED            : November 24, 2015
INVENTOR(S)      : Liangheng Qiu et al.

It is certified that error appears in the above-identified patent and that said Letters Patent is hereby corrected as shown below:

In the claims,

In column 6, line 31, after "comprises," please delete "a"

Signed and Sealed this
Sixteenth Day of February, 2016

Michelle K. Lee
*Director of the United States Patent and Trademark Office*